United States Patent
Hossan et al.

(10) Patent No.: US 7,585,935 B2
(45) Date of Patent: *Sep. 8, 2009

(54) PURIFIED POLYMERIC MATERIALS AND METHODS OF PURIFYING POLYMERIC MATERIALS

(75) Inventors: Robert John Hossan, Delmar, NY (US); Christian Lietzau, Delmar, NY (US); Matthew Frank Niemeyer, North Chatham, NY (US); Mukund Parthasarathy, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/098,548

(22) Filed: Apr. 7, 2008

(65) Prior Publication Data

US 2008/0187753 A1 Aug. 7, 2008

Related U.S. Application Data

(63) Continuation of application No. 11/183,714, filed on Jul. 18, 2005, now Pat. No. 7,354,990, which is a continuation-in-part of application No. 10/922,194, filed on Aug. 19, 2004, now Pat. No. 7,314,907, which is a continuation-in-part of application No. 10/648,604, filed on Aug. 26, 2003, now Pat. No. 7,244,813.

(51) Int. Cl.
*C08G 64/00* (2006.01)
*C08G 63/02* (2006.01)

(52) U.S. Cl. .................. 528/480; 264/140; 264/176.1; 264/219; 428/402

(58) Field of Classification Search ................ 528/480; 264/140, 176.1, 219; 428/402
See application file for complete search history.

(56) References Cited

U.S. PATENT DOCUMENTS

| | | |
|---|---|---|
| 3,306,874 A | 2/1967 | Hay |
| 3,306,875 A | 2/1967 | Hay |
| 3,365,422 A | 1/1968 | Van Dort |
| 3,383,435 A | 5/1968 | Cizek |
| 3,457,343 A | 7/1969 | Lohizen et al. |
| 3,639,656 A | 2/1972 | Bennett et al. |
| 3,642,699 A | 2/1972 | Cooper et al. |
| 3,661,848 A | 5/1972 | Cooper et al. |
| 3,733,299 A | 5/1973 | Cooper et al. |
| 3,838,102 A | 9/1974 | Bennett et al. |
| 3,962,181 A | 6/1976 | Sakauchi et al. |
| 3,973,890 A | 8/1976 | Porter et al. |
| 4,054,553 A | 10/1977 | Olander |
| 4,083,828 A | 4/1978 | Olander |
| 4,092,294 A | 5/1978 | Bennett, Jr. et al. |
| 4,373,065 A | 2/1983 | Prest, Jr. |
| 4,421,470 A | 12/1983 | Nakamura |
| 4,500,706 A | 2/1985 | Mathis et al. |
| 4,719,594 A | 1/1988 | Young et al. |
| 4,760,118 A | 7/1988 | White et al. |
| 4,804,712 A | 2/1989 | Traugott et al. |
| 4,808,262 A | 2/1989 | Aneja et al. |
| 4,845,142 A | 7/1989 | Niwano et al. |
| 4,889,756 A | 12/1989 | Barzynski et al. |
| 4,965,028 A | 10/1990 | Maus et al. |
| 4,987,194 A | 1/1991 | Maeda et al. |
| 4,992,222 A | 2/1991 | Banevicius et al. |
| 4,994,217 A | 2/1991 | Banevicius et al. |
| 5,017,655 A | 5/1991 | Kase et al. |
| 5,053,288 A | 10/1991 | Hashimoto et al. |
| 5,102,591 A | 4/1992 | Hasson et al. |
| 5,130,356 A | 7/1992 | Feuerherd et al. |
| 5,135,791 A | 8/1992 | Imai et al. |
| 5,204,410 A | 4/1993 | Banevicius et al. |
| 5,250,486 A | 10/1993 | Shaffer |
| 5,586,110 A | 12/1996 | Nakaki |
| 5,607,700 A | 3/1997 | Kando et al. |
| 5,833,848 A | 11/1998 | Tominari et al. |
| 6,015,512 A | 1/2000 | Yang et al. |
| 6,183,829 B1 | 2/2001 | Daecher et al. |
| 6,306,978 B1 | 10/2001 | Braat et al. |
| 6,365,710 B1 | 4/2002 | Wang et al. |
| 6,372,175 B1 | 4/2002 | Inoue et al. |
| 6,407,200 B1 | 6/2002 | Singh et al. |
| 6,437,084 B1 | 8/2002 | Birsak et al. |
| 6,444,779 B1 | 9/2002 | Singh et al. |
| 6,469,128 B1 | 10/2002 | Guo et al. |

(Continued)

FOREIGN PATENT DOCUMENTS

| | | |
|---|---|---|
| EP | 225801 | 12/1986 |
| EP | 271000 | 12/1987 |
| EP | 295891 | 6/1988 |
| EP | 303209 | 8/1988 |
| EP | 375937 | 4/1990 |

(Continued)

OTHER PUBLICATIONS

JP6313722, published Jan. 21, 1988, Machine Translation.
JP63256427, published Oct. 24, 1988, Machine Translation, 14 pages.
JP63301247, published Dec. 8, 1988, Machine Translation, 15 pages.
JP63309547, published Dec. 16, 1988, Machine Translation, 22 pages.

(Continued)

*Primary Examiner*—Terressa M Boykin
(74) *Attorney, Agent, or Firm*—Cantor Colburn LLP

(57) ABSTRACT

A method is disclosed to purify a polymeric material by filtering a melt comprising poly(arylene ether) and poly(alkenyl aromatic) through a melt filtration system. The method provides a filtered polymeric composition having reduced levels of particulate impurities. The filtered polymeric composition prepared is suitable for use in data storage media applications.

8 Claims, 1 Drawing Sheet

U.S. PATENT DOCUMENTS

| | | |
|---|---|---|
| 6,475,589 B1 | 11/2002 | Pai-Paranjape et al. |
| 6,667,952 B2 | 12/2003 | Komaki et al. |
| 6,696,528 B2 | 2/2004 | Moses et al. |
| 6,775,838 B2 | 8/2004 | Komaki et al. |
| 6,924,350 B2 | 8/2005 | Dong et al. |
| 6,949,622 B2 | 9/2005 | Silvi et al. |
| 7,041,780 B2 * | 5/2006 | Buckley et al. ............. 528/501 |
| 2001/0000520 A1 | 4/2001 | Braat et al. |
| 2002/0048691 A1 | 4/2002 | Davis et al. |
| 2002/0055608 A1 | 5/2002 | Braat et al. |
| 2002/0062054 A1 | 5/2002 | Cistone et al. |
| 2002/0094455 A1 | 7/2002 | Feist et al. |
| 2002/0151606 A1 | 10/2002 | Bates et al. |
| 2002/0197438 A1 | 12/2002 | Hay et al. |
| 2002/0197441 A1 | 12/2002 | Hariharan et al. |
| 2003/0044564 A1 | 3/2003 | Dris et al. |
| 2003/0067089 A1 | 4/2003 | Wang et al. |
| 2005/0048252 A1 | 3/2005 | Dris et al. |
| 2005/0049333 A1 | 3/2005 | Buckley et al. |
| 2005/0049362 A1 | 3/2005 | Buckley et al. |
| 2005/0064129 A1 | 3/2005 | Dong et al. |
| 2005/0117405 A1 | 6/2005 | Dris et al. |
| 2005/0129953 A1 | 6/2005 | Breitung et al. |
| 2005/0180284 A1 | 8/2005 | Hay et al. |
| 2005/0202201 A1 | 9/2005 | Hay et al. |
| 2005/0233151 A1 | 10/2005 | Feist et al. |
| 2005/0234218 A1 | 10/2005 | Silvi et al. |
| 2005/0234219 A1 | 10/2005 | Silvi et al. |
| 2006/0089487 A1 | 4/2006 | Silvi et al. |

FOREIGN PATENT DOCUMENTS

| | | |
|---|---|---|
| EP | 642124 | 9/1994 |
| EP | 724259 | 1/1996 |
| EP | 770637 | 10/1996 |
| EP | 1047055 | 4/1999 |
| EP | 1031972 | 2/2000 |
| EP | 1130587 | 3/2001 |
| EP | 1167419 | 6/2001 |
| EP | 1167420 | 6/2001 |
| EP | 1167421 | 6/2001 |
| EP | 1271499 | 1/2003 |
| WO | WO0111618 | 2/2001 |
| WO | WO0243943 | 6/2002 |

OTHER PUBLICATIONS

JP6386738, published Apr. 18, 1988, Machine Translation, 22 pages.
JP6391231, published Apr. 21, 1988, Machine Translation, 42 pages.
JP6391232, published Apr. 21, 1988, Machine Translation, 33 pages.
JP6442601, published Feb. 14, 1989, Machine Translation, 15 pages.
JP9237437, published Sep. 9, 1997, Machine Translation, 37 pages.
Paul F. Ranken, "Flame Retardants" Plastics Additives Handbook, 5th Edition, Hanserr Publishers, Munich 2001 pp. 681-696.
Plant Design, Encyclopedia of Polymer Science3, 1990, 252-253, Published by John Wiley and Sons, Inc.
JP11268098, Publication Date Oct. 5, 1999, Abstract Only, 1 page.
JP 63256427, Optical Element Manufacture Resin Composition Aromatic Polyvinyl Polymer Polyphenylene Ether; Oct. 24, 1988; Section Ch, Week 198848, Derwent Publications Ltd., London, GB; AN 1988-342863; XP002303242, Abstract onlyl 1 page.
JP2107651, published Apr. 19, 1990, Machine Translation, 9 pages.
JP2208342, published Aug. 17, 1990, Machine Translations, 17 pages.
JP58147332, Publication Date Sep. 2, 1983, Abstract Only, 1 page.
JP6093014, Publication Date Apr. 5, 1994, Abstract Only, 1 page.
JP63056832, Publication Date Nov. 3, 1997, Abstract Only, 1 page.

* cited by examiner

PURIFIED POLYMERIC MATERIALS AND METHODS OF PURIFYING POLYMERIC MATERIALS

CROSS-REFERENCE TO RELATED APPLICATIONS

This application is a continuation of U.S. patent application Ser. No. 11/183,714, filed Jul. 18, 2005 now U.S. Pat. No. 7,354,990, which is a continuation-in-part application of U.S. patent application Ser. No. 10/922,194, filed Aug. 19, 2004 and now U.S. Pat. No. 7,314,907, which is a continuation-in-part application of U.S. patent application Ser. No. 10/648,604, filed Aug. 26, 2003 and now U.S. Pat. No. 7,244,813, all of which are herein incorporated by reference in their entirety.

BACKGROUND OF INVENTION

Disclosed herein are methods directed to purifying polymeric material by filtering melts comprising poly(arylene ether) and/or poly(alkenyl aromatic) resins. The methods are more particularly directed to filtering melts comprising poly(arylene ether) resin, poly(alkenyl aromatic) resin or a combination of poly(arylene ether) resin and poly(alkenyl aromatic) resin to result in filtered polymeric materials having reduced amounts of particulate impurities.

Optical, magnetic and magneto-optic media are primary sources of high performance storage technology that enable high storage capacity coupled with a reasonable price per megabyte of storage. Areal density, typically expressed as billions of bits per square inch of disk surface area (gigabits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording methods and other techniques.

Polymeric data storage media has been employed in areas such as compact disks (CD) and recordable or re-writable compact discs (e.g., CD-RW), and similar relatively low areal density devices, e.g. less than about 1 $Gbits/in^2$, which are typically read-through devices requiring the employment of a good optical quality substrate having low birefringence.

Unlike the CD, storage media having high areal density capabilities, typically up to or greater than about 5 $Gbits/in^2$, employ first surface or near field read/write techniques in order to increase the areal density. For such storage media, although the optical quality of the substrate is not relevant, the physical and mechanical properties of the substrate become increasingly important. For high areal density applications, including first surface applications, the surface quality of the storage media can affect the accuracy of the reading device, the ability to store data, and replication qualities of the substrate.

While there are materials presently available for use in data storage media, there remains a need for additional polymeric materials possessing the combined attributes necessary to satisfy the increasingly exacting requirements for data storage media applications.

SUMMARY OF INVENTION

In one embodiment, the above-described needs are alleviated by a method of purifying a polymeric material comprising melt blending poly(arylene ether) and poly(alkenyl aromatic) in an extruder to form a melt (also called a melt mixture); and filtering the melt through a melt filtration system to produce a filtered polymeric material.

In another embodiment, the melt filtration system utilizes a screen pack, a sintered metal filter, or a combination thereof. In another embodiment; the melt has an average residence time in the extruder of less than or equal to 5 minutes.

In another embodiment, a composition comprising poly(arylene ether) and poly(alkenyl aromatic) is provided wherein the composition has less than 30, or, more specifically, less than 20, or, even more specifically, less than 10, particulates having an average diameter of 30 micrometers per gram of the composition.

In another embodiment, a composition comprising poly(arylene ether) and poly(alkenyl aromatic) is provided wherein the composition has less than 200, or, more specifically, less than 140, or, even more specifically, less than 100, particulates having an average diameter of 20 micrometers per gram of the composition.

In another embodiment, a filtered polymeric composition is provided that has less than 30, or, more specifically, less than 20, or, even more specifically, less than 10, particulates of 30 micrometer average diameter per gram of the filtered composition in combination with less than 200, or, more specifically, less than 140, or, even more specifically, less than 100, particulates having an average diameter of 20 micrometer per gram of the filtered composition.

In another embodiment, filtered compositions, including the aforementioned filtered compositions, are provided wherein the compositions contain zero particulates having an average diameter of 175 micrometers or larger, or, more specifically, 140 micrometers or larger, or, even more specifically, 100 micrometers or larger, per gram of the filtered composition. Other embodiments, including articles made from the filtered polymeric material, are described below.

In another embodiment, a pellet substantially free of surface voids that extend greater than or equal to one third of the pellet diameter wherein the pellet consists of a filtered polymeric composition as described herein.

In another embodiment, described herein are pellets having an unvibrated bulk density which is greater than or equal to 94% of the vibrated bulk density wherein the pellet consists of a filtered polymeric composition as described herein.

In another embodiment, a method of making a data storage medium substrate is disclosed, comprising melt blending poly(arylene ether) and poly(alkenyl aromatic) in an extruder to form a melt; and melt filtering the melt through a melt filtration system to produce a filtered polymeric composition; wherein the filtered polymeric composition has, based on an average of five sample measurements, at least one of:

(a) less than 200 particulates having an average diameter of 20 micrometers per gram of the filtered polymeric material, (b) less than 30 particulates having an average diameter of 30 micrometers per gram of the filtered polymeric material, (c) less than 5 particulates having an average diameter of 50 micrometers per gram of the filtered polymeric material, (d) less than 50 particulates having an average diameter within the range of 20 to 100 micrometers per fifteen grams of the filtered polymeric material, and (e) zero particulates having an average diameter of at least 175 micrometers per gram of the filtered polymeric material pelletizing the filtered polymeric composition with an underwater die face pelletizer to form pellets and injection molding the pellets to form the data storage medium substrate.

DETAILED DESCRIPTION

Figure 1:
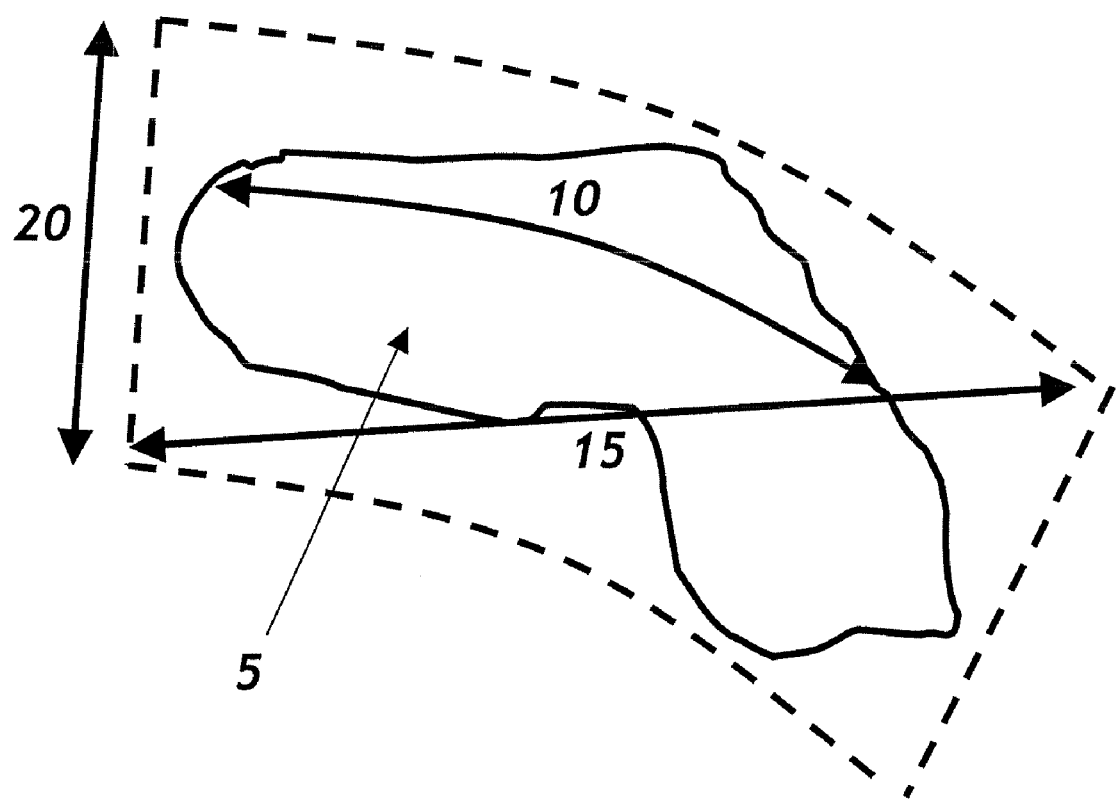
FIG. 1 is a schematic representation of a defect on a data storage media.

Due to the surface quality requirements of high areal density storage media, it is desirable that current data storage media are prepared from materials containing limited quantities of particulate impurities. Visible particulate impurities, such as gels and carbonized polymeric material, are undesirable as an aesthetic defect resulting in a consumer's perception of an inferior quality product. Particles having sizes larger than 50 micrometers can act as stress concentrators in molded articles, thereby reducing the impact strength of these articles. Particulate impurities 1 micrometer in size contribute to an increase in haze which can affect the transmittance of light through or transparency of articles molded from material containing such impurities. Most importantly, particulate impurities may affect surface quality of storage media thereby affecting read accuracy, data storage, and replication.

Visible particulates or "black specks" are dark or colored particulates generally visible to the human eye without magnification and having an average diameter of 30 micrometers or greater. Although some people are able to without magnification visually detect particles having an average diameter smaller than 30 micrometers and other people can detect only particles having an average diameter larger than 30 micrometers, the terms "visible particles," "visible particulates," and "black specks" when used herein without reference to a specified average diameter means those particulates having an average diameter of 30 micrometers or greater. Black specks, as well as other smaller microscopic particulates, are typically present in poly(arylene ether) compositions as the poly (arylene ether) is subject to oxidative degradation at high temperatures. Poly(arylene ether)s tend to form carbonized "black specks" when processed at the high extruder shear rates and/or at high temperatures for extended periods of time as are typically used in the manufacture of compositions of poly(arylene ether) and poly(alkenyl aromatic) resins.

The above-described needs are alleviated by a method of purifying a polymeric material comprising melt blending poly(arylene ether) and poly(alkenyl aromatic) in an extruder to form a melt; and filtering the melt through a melt filtration system to produce a filtered polymeric material. The melt generally has an average residence time in the extruder of less than or equal to 5 minutes. The filtration removes particulate impurities present in the polymeric material to result in a filtered polymeric material comprising reduced quantities of particulate impurities.

As used herein the term "polymeric material" is inclusive of a composition comprising poly(arylene ether) resin and poly(alkenyl aromatic) resin.

As described herein, melts of polymer mixtures, such as poly(arylene ether) and poly(alkenyl aromatic) mixtures, may be melt filtered to remove particulate impurities. The residence time, temperature, and shear rate of the melt in the extruder should be controlled to minimize decomposition of the polymeric material, especially the poly(arylene ether) component. Poly(arylene ether)s are known to oxidize and form gels if maintained at high temperatures. These resins may also form carbonized "black specks" or degrade in color (darken) if processed at high temperatures for extended periods of time. Therefore, it is preferable to minimize the residence time of the melt by selection of extruder length and extruder screw design and by controlling the screw speed and feed rate. An average residence time of less than or equal to 5 minutes may be employed, or, more specifically, less than or equal to 2 minutes, or, even more specifically, less than or equal to 1 minute.

It is also preferable to minimize the residence time of the melt through the melt filtration system. The melt filtration system may be designed to provide short residence times based on, among other options, the selection of the surface area of the filter, the type of filter, and volume of the melt filtration housing. A higher filter surface area and a smaller housing volume can provide shorter residence times.

The melt filtration system of the extruder is preferably located at the terminal barrel of the extruder, and more preferably at the die head of the extruder. The extruder may comprise a single melt filtration system or multiple melt filtration systems, including combinations of different types of melt filtration systems.

Any type of extruder that is capable of providing a homogenous melt of poly(arylene ether), poly(alkenyl aromatic) and/or additional resins and additives, may be used. Useful types of extruders include, for example, a twin screw counter-rotating extruder, a twin screw co-rotating extruder, a single screw extruder, a single screw reciprocating extruder, a kneader, a ring extruder, a combination of the foregoing, and the like. A single extruder or multiple extruders may be employed. In one embodiment, a single extruder is employed.

Although single screw extruders may be utilized, it is generally preferable to use multi-screw extruders due to their greater pumping capability through the melt filtration system. Twin-screw counter-rotating extruders, such as those manufactured by Leistritz Extrusionstechnik and NFM Welding-Engineers, are useful and are often preferred where higher pressures or longer residence times are desired. Conical counter-rotating twin-screw extruders, such as those manufactured by Milacron, are also preferred due to large feed capabilities and high pumping efficiencies. Twin-screw co-rotating, intermeshing extruders, such as those manufactured by Coperion Werner-Pfleiderer, are especially preferred due to their high through-put rates, short residence times, flexible screw designs, outstanding alloying, and other design benefits. Both three-lobe and two-lobe machines are generally useful with two-lobe machines generally preferred due to their higher throughput rates. Ring extruders, such as those manufactured by 3+ Extruder GmbH, are also useful and typically comprise a ring of three to twelve small screws or grooved rolls around a static rod or core. The screws co rotate and intermesh on two sides providing good dispersive and distributive mixing as well as the ability to control the residence time of the material in the extruder. The intermeshing design also provides two clean wipes to the screw's shear, mixing, and kneading elements.

The extruder length should be sufficient to allow for melting and intimate admixing of the polymeric components and any additional additives as well as optionally venting of the melt mixture. Extruders as short as five barrel sections may be employed, although longer extruders are also useful.

When preparing blends of poly(arylene ether) solvent, monomers, and other low molecular weight materials are removed from the extruder through the vent system. A particularly useful process to improve the removal of volatile substances from poly(arylene ether) or poly(arylene ether) resin blends includes steam stripping as describe in U.S. Pat. No. 5,204,410 to Banevicius et al., U.S. Pat. No. 5,102,591 to Hasson et al., U.S. Pat. Nos. 4,994,217 to Banevicius, and 4,992,222 to Banevicius et al. Steam stripping is typically performed in an extruder comprising ports for the injection of water or steam and sufficient vacuum vent capability to remove the stripped volatiles and water. In one embodiment, water or steam are the stripping agents, and the proportion employed is up to 15 percent by weight of the polymer composition, to be divided equally, or unequally, among the two or more injection ports located along the length of the extruder barrel. In one embodiment, the proportion is 0.25 to 15 weight percent, or, more specifically, 0.5 to 5 weight percent since an amount within these ranges is generally very effective for removal of volatiles without burdening the vacuum system.

Blanketing of the internal free space of the extruder with an inert gas to minimize the exposure of molten polymer to oxygen is also useful to minimize gel and black speck formation. By inert is meant a gas that does not result in oxidation or other chemical reaction with the molten polymeric composition and is generally substantially oxygen-free. Generally, nitrogen is used due to its low cost and ready availability, although other inert gases are also contemplated. Nitrogen (or other inert gas) can be added into one or more of the feeder systems, extruder feed zones, vents, melt filtration systems, and other areas of the extruder in which the molten polymer can come into contact with oxygen.

Also contemplated are extruders comprising one or more side feeders along the extruder barrel suitable to feed additional components to the melt. Additional components include additional resins, functionalizing agents and/or additives.

The extruder is run at temperatures suitable to produce an intimate blend of the components that compose the melt mixture, but low enough to minimize decomposition of the melt mixture. A range of extruder temperatures that may be employed is 260° C. to 380° C. Within this range a temperature of less than or equal to 340° C. may be employed, or, more specifically, less than or equal to 320° C. Also within this range a temperature of greater than or equal to 280° C., or, more specifically, greater than or equal to 290° C. may be employed. Within the range of extruder temperatures, the melt mixture generally has a temperature of 280° C. to 340° C.

The conditions selected to begin and end the melt blending and melt filtering operations are important to control so as to minimize the formation of gels and black specks during the process. When an extruder is utilized, residual material remains that is subjected to extended periods at high temperatures and can lead to formation of gels and black specks. It is desirable to begin the process with equipment that has been disassembled and cleaned of residual material so as to start with an empty equipment set although in commercial operations, such disassembly is often not feasible. Generally, a material that is compatible with the resin composition that has good thermal and oxidation stability, e.g., polystyrene, will be used to start the machine. Upon reaching a steady operating state, the composition is adjusted to achieve the desired formulation. It is typical to have an elevated number of gels and black specks during the start-up operation followed by a reduction to a steady state as may be determined via an on-line or off-line quality monitoring system.

When a twin-screw extruder is employed, the extruder operation may be defined by a specific throughput rate of 0.5 kg/hr/cm$^3$ to 8.0 kg/hr/cm$^3$. The specific throughput rate is defined as the throughput rate of the melt divided by the diameter$^3$ of the extruder barrel. Within this range a specific throughput rate of less than or equal to 7.5 kg/hr/cm$^3$, or, more specifically less than or equal to 7 kg/hr/cm$^3$ may be employed. Also within this range a throughput rate of greater than or equal to 3 kg/hr/cm$^3$, or, more specifically, greater than or equal to 5 kg/hr/cm$^3$ may be employed.

In one embodiment, a melt pump or gear pump is used in combination with the extruder to provide sufficient rate and pressure of a flow of melt through the melt filtration system. The melt pump also provides the capability to control and maintain an even flow of melt through the melt filtration system resulting in a more uniform polymeric material.

In one embodiment, the poly(arylene ether), poly(alkylene aromatic), and optional additional components may be mixed together prior to the melt blending step. Any known equipment capable of intimately admixing the components may be used, for example, mixers capable of applying shear to the components, conical screw mixers, V-blenders, twin screw compounders, Henschel mixers, ribbon blenders, and the like.

Any suitable melt filtration system or device that can remove particulate impurities from a melt mixture comprising poly(arylene ether), poly(alkenyl aromatic), or a combination of the two, may be used. In one embodiment the melt is filtered through a single melt filtration system. Multiple melt filtration systems are also contemplated.

Suitable melt filtration systems include filters made from a variety of materials such as, but not limited to, sintered-metal, metal mesh or screen, fiber metal felt, ceramic, or a combination of the foregoing materials, and the like. Particularly useful filters are sintered metal filters exhibiting high tortuosity, including the sintered wire mesh filters prepared by Pall Corporation and Martin Kurz & Company, Inc.

Any geometry of melt filter may be used including, but not limited to, cone, pleated, candle, stack, flat, wraparound, screens, cartridge, pack disc, as well as a combination of the foregoing, and the like. The selection of the geometry can vary depending on various parameters such as, for example, the size of the extruder and the throughput rate desired as well as the degree of particle filtration that is desired. Exemplary materials of construction include stainless steels, titanium, nickel, as well as other metals alloys. Various weaves of wire fabric including plain, dutch, square, twill and combinations of weaves can be used. Especially useful are filters that have been designed to minimize internal volume and low flow areas and to withstand repeated cleaning cycles.

The melt filtration system may include a periodic or continuous screen changing filter or batch filters. For example, continuous screen changing filters may include a ribbon of screen filter that is slowly passed into the path of a melt flow in an extruder. The melt mixture passes through the filter and the filter collects particulate impurities within the melt and these impurities are carried out of the extruder with the filter ribbon as it is periodically or continuously renewed with a new section of ribbon.

The pore size of the melt filter may be 0.5 micrometer to 200 micrometers. Within this range, a pore size of less than or equal to 100 micrometers, or, more specifically, less than or equal to 50 micrometers, or, even more specifically, less than or equal to 20 micrometers can be employed. Also within this range a pore size of greater than or equal to 1 micrometer, or, more specifically, greater than or equal to 7 micrometers, or, even more specifically, greater than or equal to 15 micrometers may be used.

The temperature of the melt filtration system is sufficient to maintain the material in a molten state and at a sufficiently low viscosity for the material to pass through the filter without excessive pressure drop. Generally useful temperatures are 260° C. to 380° C. Within this range a temperature of less than or equal to 340° C., or, more specifically, less than or equal to 320° C. may be employed. Also within this range a temperature of greater than or equal to 280° C., or, more specifically, greater than or equal to 290° C. may be employed.

In order to operate the overall melt filtering process in a continuous fashion for long periods of time, it is often desirable to employ a by-pass system for the melt filtration system or device. In a by-pass system, a continuous melt flow is maintained and redirected into a reserve melt filtration system or device. The by-pass system can be operated by a series of automated valves that have been set to engage at a pre-determined value, e.g., predetermined pressure drop or after a predetermined amount of material has been filtered, or can be interconnected with an in-line or off-line quality monitoring system, or may be operated or engaged manually. In one embodiment, the process is operated under conditions wherein less than a five-fold, or, more specifically, less that a three-fold, pressure drop is observed as compared to the initial pressure drop obtained with a clean filtration system. Operation of the melt filtering process in a continuous fashion for long periods of time generally helps to minimize formation of gels and black specks formed during the start-up and shut-down operations and enables a more steady state process to be achieved. Processed materials obtained during the start-up and shut-down operations that are outside the desired particulate level may be reprocessed to avoid wasted material.

The filtered polymeric material obtained is substantially free of visible particulates. "Substantially free of visible particulate impurities" means that a ten gram sample of polymeric material dissolved in fifty milliliters of chloroform ($CHCl_3$) exhibits fewer than five visible specks when viewed with the aid of a light box. As previously explained, particles visible to the naked eye are typically those greater than 30 micrometers in diameter.

In one embodiment, the filtered polymeric material recovered from the extruder is substantially free of particulate impurities greater than 20 micrometers, or, more specifically, greater than 10 micrometers. "Substantially free of particulate impurities greater than 20 (or 10) micrometers" means that for a forty gram sample of polymeric material dissolved in 400 milliliters of $CHCl_3$, the number of particulates per gram having an average diameter of 20 (or 10) micrometers is less than 200, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

In another embodiment, the filtered polymeric material has less than 10 black specks, or, more specifically, less than 5 black specks, or, even more specifically, less than 2 black specks, larger than 100 micrometers in average diameter size per 15 grams of filtered polymeric material. In another embodiment, the filtered polymeric material has less than 5 black specks, or, more specifically, less than 2 black specks, or, even more specifically, no black specks, larger than 140 micrometers in average diameter size per 15 grams of filtered polymeric material. In another embodiment, the filtered polymeric material has less than 100 black specks, or, more specifically, less than 75 black specks, or, even more specifically, less than 50 black specks, within the 20 to 100 micrometer average diameter range per 15 grams of filtered polymeric material.

Upon extrusion, the filtered polymeric material may be pelletized by methods known in the art. For example, strands of filtered polymeric material extruded from an extruder or similar device, may be cooled in clean water baths or cooled by water spray and then chopped into pellets. The water, prior to its use in the bath or spray, may be filtered to remove impurities. Likewise the water may be recycled and filtered during the recycle loop. The water is typically filtered to remove particles greater than 20 micrometers. De-ionized filtered water is also generally preferred to remove ionic impurities that may adhere to the filtered material. When a water bath or spray is employed to regulate the temperature of the extrudate prior to cutting, the extrudate temperature can be adjusted to minimize the formation of dust and to help provide a relatively uniform pellet size. When a water bath and/or water spray is utilized, an air knife is typically employed prior to cutting the extrudate. In one embodiment, filtered air is used in the air knife to avoid contaminating the hot strands with micrometer-sized particles. An exemplary strand temperature is less than 130° C., or, more specifically, less than 90° C.

Typically, pellets are approximately 2-3 mm in size although smaller or larger pellets may also be desired. Although a variety of devices may be employed to cut the extrudate into the desired pellet size, cutting devices having multiple rotating blades and metal rollers, for example, stainless steel rollers, are often preferred. Use of rubber rollers can lead to contamination of the filtered polymeric material. Pellet screeners can be employed to remove undesired pellets that are too small or too large. When screeners and other devices, such as transfer systems, are employed for handling the pellets, equipment having elastomer components that may lead to pellet contamination are generally avoided. The pellets may be dried using techniques standard in the art including centrifugal dryers, batch or continuous oven dryers, fluid beds, and the like. Optionally, the filtered polymeric material may be transferred and isolated as pellets in a "clean room" using, for example, HEPA air filtration to prevent contamination from the surroundings. Collection and handling of the filtered resin material can be performed in a Class 100 environment. The pellets may be packaged in a variety of containers provided that such containers do not lead to contamination of the filtered polymeric material. In one embodiment, the pellets are vacuum packaged to draw the container tightly around the contents to reduce the shifting and breakage of the pellets into finer particles during handling and transport. Additionally, vacuum packaging enables an oxygen-free and contaminant-free environment to be maintained.

In one embodiment, the polymeric material is pelletized using an underwater die-face pelletizer. The filtered polymeric material is forced through a die located underwater, either in a water bath, a recirculating water bath or a continuous moving stream of water. The die holes may be round, square, rectangular, oval, hexagonal, pentagonal or the like. The use of the underwater die face pelletizer allows the filtered polymeric material to cool before being exposed to air, decreasing the number of contaminates formed by the exposure of the molten filtered polymeric material to air. A cutting means, typically a multi bladed rotating cutter, is located at the die face. The cutting means passes the die holes and wipes the die, decreasing or eliminating the amount of filtered polymeric material left on the die. Material which is left on the die can degrade and eventually detach, forming a contaminate on the extruded material. The filtered polymeric material forced through the die is cut immediately upon exiting the die and before it is fully cooled. This eliminates fines caused by breakage when cutting a cooled strand and results in a pellet having rounded edges. Additionally greater than or equal to 90%, or more specifically, greater than or equal to 95%, or, even more specifically, greater than or equal to 99% of the pellets produced by underwater die face pelletization have a continuous surface and no hole passing from one side of the pellet to the other. This is in contrast to strand pelletization in which greater than 85% of the pellets have an opening which runs throughout the pellet.

Without being bound by theory, it is believed that the rounded edges, the continuous surface or a combination thereof on the pellets produced by underwater die face pelletization reduce the amount of fines produced by movement of the pellets during handling, packaging, and shipment. A reduction in fines reduces the number of defects in an injection molded article such as an optical storage media.

In one embodiment, the polymeric material is extruded through an underwater die face pelletizer using a die having round holes and cut to form pellets. The die may be heated, insulated or heated and insulated to prevent to molten filtered polymeric material from solidifying too early. The die can be maintained at a temperature of 275° C. to 325° C. Within this range the die can be maintained at a temperature greater than or equal to 285° C., or, more specifically, a temperature greater than or equal to 295° C. Also within this range, the die can be maintained at a temperature less than or equal to 315° C., or, even more specifically, less than or equal to 305° C. The die holes may have a diameter of 1 millimeter to 6 millimeters. Within this range, the die holes may have a diameter greater than or equal to 2 millimeters, or, more specifically greater than or equal to 3 millimeters. Also within this range, the die holes may have a diameter less than or equal to 5 millimeters, or, more specifically, less than or equal to 4 millimeters.

In one embodiment, the pellets produced by underwater die face pelletization have an average diameter of 3 to 4 millimeters. An average diameter is defined as the average of the longest diameter and the shortest diameter of the pellet where a diameter is a line drawn across the pellet that passes through the center of the pellet. When the pellet is spherical then the diameters will be equal in length. When the pellets are ovoid various diameters will have unequal lengths. In one embodiment, the ratio of the shortest diameter to the longest diameter is 1 to 0.8. The size of the longest and shortest diameters may be determined by the size of the die holes, the feed rate or throughput of the extruder, the number of blades on the cutter, the spacing of the blades and the cutter speed. The pellet size, in combination with the density of the filtered polymeric material will determine the weight of the individual pellets.

In one embodiment the pellets are substantially free of surface voids that extend greater than or equal to one third of the pellet diameter. Substantially free is defined as comprising less than or equal to 20%, or, more specifically, less than or equal to 15%, or even more specifically, less than or equal to 10% of pellets having a surface void that extends greater than or equal to one third of the pellet diameter. The amount of pellets having a surface void that extends greater than or equal to one third of the diameter can be determined by visual inspection of a randomly selected group of at least one hundred pellets.

The weight of the pellets may be determined by the following equation:

pellet weight=feedrate/(number of die holes×cutter speed×number of blades).

In one embodiment the pellets produced by underwater pelletization have an average pellet weight of 0.0005 grams to 0.10 grams. Within this range the average pellet weight may be greater than or equal to 0.005 grams, or, more specifically, greater than or equal to 0.015 grams. Also within this range the pellet weight may be less than or equal to 0.065 grams, or, more specifically, less than or equal to 0.04 grams.

Pellets made by underwater pelletization have an unvibrated (unpacked) bulk density which is greater than or equal to 94%, or, more specifically, greater than or equal to 96%, or, even more specifically, greater than or equal to 98% of the vibrated (packed) bulk density. Unvibrated bulk density is determined by weighing a known volume of pellets. Vibrated bulk density is determined by filling a container of known volume with unvibrated pellets and tapping the side of the container repeatedly with enough force to cause a small but discernable sideways movement of pellets in the container. After at least 20 such taps on the container additional pellets are added to refill the container. The tapping and refilling cycle is repeated numerous times. When no more pellets can be added to the container after tapping, the vibrated pellets are weighed. Without being bound by theory, it is believed that using pellets which have an unvibrated bulk density that is greater than or equal to 94% of the vibrated bulk density reduces the amount of time required to fill the screw for injection molding, thus reducing cycle time and improving productivity.

In another embodiment, the polymeric material is pelletized using a water ring pelletizer system. A suitable method of pelletizing is generally described in U.S. Pat. No. 6,372,175. Useful pelletizing machines, including die-face pelletizers, are generally described in U.S. Pat. Nos. 3,973,890, 4,421,470, and 5,607,700.

Rather than extruding pellets, the filtered polymeric material may be extruded as fibers, tubes, films, or sheets by appropriate choice of the die assembly.

Various in-line and off-line monitors may also be employed to judge the quality of the filtered material during the filtering process. Such monitors often employ light or laser sensing devices to detect visible specks in the extrudate and/or in the pellets. The monitors can be interconnected with the operation of the processing equipment and programmed to automatically adjust the process based upon predetermined criteria. Likewise, the monitors may sound alarms to alert the operators based on the predetermined criteria.

The term poly(arylene ether) includes polyphenylene ether (PPE) and poly(arylene ether) copolymers; graft copolymers; poly(arylene ether)ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

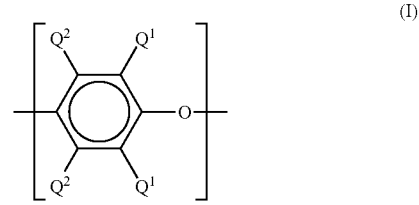

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. It will be understood that the term "haloalkyl" includes alkyl groups substituted with one or more halogen atoms, including partially and fully halogenated alkyl groups. In one embodiment, each $Q^1$ is alkyl or phenyl, especially $C_{1-4}$ alkyl, and each $Q^2$ is hydrogen or $C_{1-4}$ alkyl.

Both homopolymer and copolymer poly(arylene ether) are included. Exemplary homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s used herein may further include combinations comprising at least one of the above. In one embodiment, the poly(arylene ether)s can be poly(2,6-dimethylphenylene ether) and/or poly(2,6-dimethylphenylene ether-co-2,3,6-trimethylphenylene ether) such as those described in U.S. Pat. No. 6,407,200 to Singh et al. and U.S. Pat. No. 6,437,084 to Birsak et al.

The poly(arylene ether) generally has a number average molecular weight of 3,000-40,000 atomic mass units (amu) and a weight average molecular weight of 20,000-80,000 amu, as determined by gel permeation chromatography. The poly(arylene ether) may have an intrinsic viscosity (IV) of 0.10 to 0.60 deciliters per gram (dl/g), as measured in chloroform at 25° C. Within this range the poly(arylene ether) can have an IV of less than or equal to 0.48 dl/g, or, more specifically, less than or equal to 0.40 dl/g. Also within this range the poly(arylene ether) can have an IV of greater than or equal to 0.29, or, more specifically, greater than or equal to 0.33 dl/g. It is also possible to utilize a high intrinsic viscosity poly (arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Suitable poly(arylene ether)s include, but are not limited to, poly(2,6-dimethyl-1,4-phenylene ether); poly(2,3,6-trimethyl-1,4-phenylene)ether; poly(2,6-dimethylphenylene ether-co-2,3,6-trimethylphenylene ether); poly(2,6-diethyl-1,4-phenylene) ether; poly(2-methyl-6-propyl-1,4-phenylene)ether; poly(2,6-dipropyl-1,4-phenylene)ether; poly (2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene) ether; poly(2,6-dichloro-1,4-phenylene)ether; poly(2-methyl-6-phenyl-1,4-phenylene)ether; poly(2-ethoxy-1,4-phenylene)ether; poly(2-chloro-1,4-phenylene)ether; poly(2,6-dibromo-1,4-phenylene)ether; poly(3-bromo-2,6-dimethyl-1,4-phenylene) ether; or a mixture of the foregoing poly(arylene ether)s.

Suitable base titratable functionalized poly(arylene ether) resins include, but are not limited to, those prepared via reaction with an appropriate acid or anhydride functionalization agent. For example those prepared by melt reaction of poly(arylene ether) with alpha, beta unsaturated carbonyl compounds, including maleic anhydride, maleic acid, fumaric acid, citraconic anhydride, citraconic acid, itaconic anhydride, itaconic acid, aconitic anhydride, aconitic acid, and their esters and amines; alpha-hydroxy carbonyl compounds including carboxylic acids such as citric acid and maleic acid; derivatives of 5-hydroxybenzene-1,2,4-tricarboxylic anhydride, such as the 5-acetyl-derivative or a 4-ester-derivative such as the phenyl ester; trimellitic anhydride aryl esters, including trimellitic anhydride phenyl salicylate; and reaction products and combinations comprising at least one of the foregoing, among others, can be employed. Alternatively, poly(arylene ether) may be functionalized with acidic or latent acidic groups in a suitable solvent. Examples of such processes include metallation of poly(arylene ether) in tetrahydrofuran (THF) followed by quenching with carbon dioxide or capping of poly(arylene ether) in toluene solution with trimellitic anhydride acid chloride. Typically, less than or equal to 10 wt % functionalization agent can be used (based on the weight of the poly phenylene ether and the agent), or, more specifically, less than or equal to 6 wt % or, even more specifically, 1.5 wt % to 4 wt %.

In one embodiment, the poly(arylene ether) comprises a capped poly(arylene ether). The capping may be used to reduce the oxidation of terminal hydroxy groups on the poly (arylene ether) chain. The terminal hydroxy groups may be inactivated by capping with an inactivating capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and salicylic carbonate and linear polysalicylates. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. In one embodiment the capping agents are salicylic carbonate and the polysalicylates, especially linear polysalicylates. When capped, the poly(arylene ether) may be capped to any desirable extent up to 80 percent, or, more specifically, up to 90 percent, or, even more specifically, up to 100 percent of the hydroxy groups are capped. Suitable capped poly(arylene ether) and their preparation are described in U.S. Pat. Nos. 4,760,118 to White et al. and 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), is susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine (salicylamide). The removal of the amino group and the capping provides a poly(arylene ether) that is more stable to high temperatures, thereby resulting in fewer degradative products, such as gels or black specks, during processing of the poly(arylene ether).

Based upon the foregoing, it will be apparent to those skilled in the art that the contemplated poly(arylene ether) resin may include many of those poly(arylene ether) resins presently known, irrespective of variations in structural units or ancillary chemical features.

The poly(arylene ether)s are typically prepared by the oxidative coupling of at least one monohydroxyaromatic compound in the presence of a catalyst system and solvent. There is no particular limitation on the monohydric phenol used in the poly(arylene ether) synthesis. Suitable monohydroxyaromatic compounds include those according to the following formula (II)

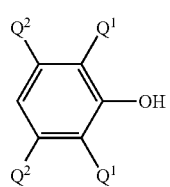

(II)

wherein each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, or halohydrocarbonoxy wherein at least two carbon atoms separate the halogen and oxygen atoms, or the like. In one embodiment, each $Q^1$ is alkyl or phenyl, especially $C_{1-4}$ alkyl, and each $Q^2$ is hydrogen or $C_{1-4}$ alkyl. Exemplary monohydroxyphenols include 2,6-dimethylphenol and 2,3,6-trimethylphenol.

In one embodiment, the monohydroxyphenol is 2,6-dimethylphenol having a purity of greater than 99 weight percent, or, more specifically, greater than 99.67 weight percent, or, even more specifically, greater than 99.83 weight percent. The 2,6-dimethylphenol can comprise less than 0.004 weight percent phenol, or, more specifically, less than 0.003 weight percent phenol. In one embodiment, the 2,6-dimethylphenol contains less than 0.12 weight percent cresol, or, more specifically, less than 0.087 weight percent cresol. Cresol includes, for example, o-cresol, m-cresol, p-cresol, or a combination comprising at least one of the foregoing cresols. In one embodiment, the 2,6-dimethylphenol contains less than 0.107 weight percent of other mono- , di-and/or trialkylphenols, or, more specifically, less than 0.084 weight percent. The other mono- , di- and/or trialkylphenols may include, for example, 2,3,6-trimethylphenol, 2,6-ethylmethylphenol, 2-ethylphenol, 2,4,6-trimethylphenol, or a combination comprising at least one of the foregoing other mono- , di- and/or trialkylphenols. In one embodiment, the 2,6-dimethylphenol comprises less than 0.072 weight percent of another dimethylphenol besides 2,6-dimethylphenol, or, more specifically, less than 0.055 weight percent of another dimethylphenol. The other dimethylphenol may be 2,4-dimethylphenol, 2,3-dimethylphenol, 2,5-dimethylphenol, 3,5-dimethylphenol, 3,4-dimethylphenol, or a combination comprising at least one of the foregoing dimethylphenols. It is believed that minimizing the amounts of phenol, cresol, other dimethylphenols, and mono- , di- , and/or trialkylphenols in the 2,6-dimethylphenol monomer leads to a reduction in undesired branching or chain stopping reactions and helps maintain the integrity of the resulting poly(phenylene ether) physical properties.

The oxidative coupling of the monohydric phenol uses an oxygen-containing gas, which is typically oxygen ($O_2$) or air.

Suitable organic solvents for the oxidative coupling include aliphatic alcohols, ketones, aliphatic and aromatic hydrocarbons, chlorohydrocarbons, nitrohydrocarbons, ethers, esters, amides, mixed ether-esters, sulfoxides, and the like, and combinations comprising at least one of the foregoing organic solvents, providing they do not interfere with or enter into the oxidation reaction. Exemplary solvents include $C_6$-$C_{18}$ aromatic hydrocarbons such as benzene, toluene, and xylene; halogenated hydrocarbons such as dichloromethane, and chloroform; and halogenated aromatic hydrocarbons such as chlorobenzene and dichlorobenzene.

The solvent may comprise, in addition to a $C_6$-$C_{18}$ aromatic hydrocarbon, a $C_3$-$C_8$ aliphatic alcohol that is a poor solvent for the poly(arylene ether), such as, for example, n-propanol, isopropanol, n-butanol, t-butanol, n-pentanol, and the like, and combinations comprising at least one of the foregoing $C_3$-$C_8$ aliphatic alcohols. The solvent may further comprise, in addition to a $C_6$-$C_{18}$ aromatic hydrocarbon and a $C_3$-$C_8$ aliphatic alcohol, methanol or ethanol, which act as an antisolvent for the poly(arylene ether). The $C_6$-$C_{18}$ aromatic hydrocarbon, the $C_3$-$C_8$ aliphatic alcohol, and the methanol or ethanol may be combined in any proportion, but in some embodiments, the solvent comprises at least 50 weight percent of the $C_6$-$C_{18}$ aromatic hydrocarbon.

Useful catalyst systems typically contain at least one heavy metal compound such as a copper, manganese or cobalt compound, usually in combination with various other materials. Suitable catalyst systems include cuprous chloride, cupric chloride, cuprous bromide, cupric bromide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Instead of direct addition of the above-exemplified metal salt, it is also possible to add a metal or a metal oxide and an inorganic acid, organic acid or an aqueous solution of such an acid and form the corresponding metal salt or hydrate.

The catalyst systems may also be complexed with a mono- or dialkylamine, aromatic amines or N,N'-dialkylalkylenediamines. Non-limiting examples of suitable primary, secondary or tertiary amines include mono-and dimethylamine, mono-and diethylamine, mono-and dipropylamine, mono-and dibutylamine, mono-and dibenzylamine, mono-and dicyclohexylamine, mono-and diethanolamine, methylethylamine, methylpropylamine, methylcyclohexylamine, ethylisopropylamine, benzylmethylamine, octylchlorobenzylamine, methylphenethylamine, benzylethylamine, dimethylbutylamine, N,N'-dialkylethylenediamines such as N,N'-di-tert-butylethylenediamine, and N,N'-di-isopropylethylenediamine, N,N,N'-trialkylethylenediamines, N,N'-diallkylpropylenediamines and N,N,N'-trialkylpropylenediamines.

Known processes to prepare poly(phenylene ether)s include European patent documents EP 1167421A2; EP1167419A2; and EP1167420A1, all of which are incorporated herein by reference. Further methods for preparing poly (phenylene ether)s are described, for example, in U.S. Pat. Nos. 6,407,200; 5,250,486; 5,017,655; 4,092,294; 4,083,828;

4,054,553; 3,962,181; 3,838,102; 3,733,299; 3,661,848; 3,642,699; 3,639,656; 3,365,422; 3,306,875; and 3,306,874. Based upon the foregoing, it will be apparent to those skilled in the art that the contemplated poly(arylene ether) may prepared by all methods presently known, irrespective of variations in processing conditions, reagents, or catalysts.

In one embodiment, the poly(arylene ether) is isolated by precipitation and has a copper content of less than 15 parts per million, or, more specifically, less than 5 parts per million. Additionally, the precipitated poly(phenylene ether) comprises an amount of titratable amine content of less than 1.27 weight percent, or, more specifically, less than 1.18 weight percent. A titratable amine content that is too high results in a poly(phenylene ether) having a strong odor, while too little amine content may result in a polymer having poor mechanical properties. In another embodiment, the poly(arylene ether) reaction mixture is filtered to remove, at least in part, gels and other particulates prior to isolation of the poly (arylene ether).

The term poly(alkenyl aromatic) resin as used herein includes polymers prepared by methods known in the art including bulk, suspension, and emulsion polymerization, which contain at least 25% by weight of structural units derived from an alkenyl aromatic monomer having the structure (III)

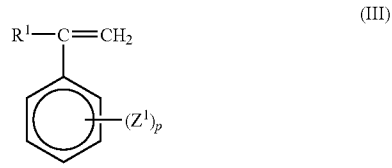

(III)

wherein $R^1$ is hydrogen, $C_1$-$C_8$ alkyl, or halogen; $Z^1$ is vinyl, halogen or $C_1$-$C_8$ alkyl; and p is 0 to 5. Exemplary alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly (alkenyl aromatic) resins comprising blends and/or grafts of a rubber modifier and a homopolymer of an alkenyl aromatic monomer (as described above), wherein the rubber modifier may be a polymerization product of at least one $C_4$-$C_{10}$ non-aromatic diene monomer, such as butadiene or isoprene, and wherein the rubber-modified poly(alkenyl aromatic) resin comprises 98 to 70 weight percent of the homopolymer of an alkenyl aromatic monomer and 2 to 30 weight percent of the rubber modifier, or, more specifically, 88 to 94 weight percent of the homopolymer of an alkenyl aromatic monomer and 6 to 12 weight percent of the rubber modifier. These rubber modified polystyrenes include high impact polystyrene (commonly referred to as HIPS).

The poly(alkenyl aromatic) resins also include non-elastomeric block copolymers, for example diblock, triblock, and multiblock copolymers of styrene and one or more polyolefins. Non-elastomeric block copolymer compositions of styrene and butadiene can also be used that have linear block, radial block, or tapered block copolymer architectures wherein the butadiene component is present up to 35 weight percent. They are commercially available from such companies as Atofina as under the trademark FINACLEAR and Chevron Phillips Chemical Company under the trademark K-RESINS.

The poly(alkenyl aromatic) resins may also include block copolymers of styrene-polyolefin-methyl methacrylate, especially poly(styrene-beta-1,4-butadiene-beta-methyl methacrylate (SBM) available from Atofina comprising blocks of polystyrene, 1,4-polybutadiene, and syndiotactic polymethyl methacrylate. SBM block copolymers available from Atofina include AF-X223, AF-X333, AF-X012, AF-X342, AF-X004, and AF-X250.

An exemplary poly(alkenyl aromatic) is a homopolymer of the alkenyl aromatic monomer (III) wherein $R^1$ is hydrogen, lower alkyl or halogen; $Z^1$ is vinyl, halogen or lower alkyl; and p is from 0 to 5. In one embodiment the homopolymer of an alkenyl aromatic monomer is the homopolymer derived from styrene (i.e., homopolystyrene). The homopolystyrene can comprise at least 99% of its weight, or, more specifically, 100% of its weight, from styrene.

The stereoregularity of the poly(alkenyl aromatic) resin may be atactic or syndiotactic. Exemplary poly(alkenyl aromatic) resins include atactic and syndiotactic homopolystyrenes. Suitable atactic homopolystyrenes are commercially available as, for example, EB3300 from Chevron, and P1800 from BASF. Atactic homopolystyrenes are sometimes referred to herein as "crystal polystyrene" resins. Useful syndiotactic polystyrene resins (SPS) are available from The Dow Chemical Company under the QUESTRA trademark.

The poly(alkenyl aromatic) may have a number average molecular weight of 20,000-100,000 atomic mass units (amu) and a weight average molecular weight of 10,000-300,000 amu.

The filtered polymeric material obtained may comprise poly(arylene ether) in an amount of 90 to 10 weight percent and poly(alkenyl aromatic) in an amount of 10 to 90 weight percent, based on the total weight of the poly(alkenyl aromatic) and poly(arylene ether) resins. Within this range the amount of poly(arylene ether) may be less than or equal to 80 weight percent, or, more specifically, less than or equal to 70 weight percent, or, even more specifically, less than or equal to 60 weight percent. Also within this range is an amount of poly(arylene ether) greater than or equal to 20 weight percent, or, more specifically, greater than or equal to 30 weight percent, or, even more specifically, greater than or equal to 40 weight percent.

The polymeric composition may further comprise various impact modifiers for improving the ductility of the composition. Useful impact modifiers include the elastomeric block copolymers, for example, A-B-A triblock copolymers and A-B diblock copolymers as well as other multiblocks such as A-B-A-B and B-A-B-A-B block copolymers. These various block copolymers are thermoplastic rubbers comprised of alkenyl aromatic blocks that are generally styrene blocks and rubber blocks, e.g., a butadiene block, in which the rubber block may be partially or totally hydrogenated. Examples of typical species of block copolymers include polystyrene-polybutadiene (SBR), polystyrene-poly(ethylene-propylene) (SEP), polystyrene-polyisoprene, poly(alpha-methylstyrene)-polybutadiene, polystyrene-polybutadiene-polystyrene (SBS), polystyrene-poly(ethylene-butylene)-polystyrene (SEBS), polystyrene-polyisoprene-polystyrene and poly(alpha-methylstyrene)-polybutadiene-poly(alpha-methylstyrene), as well as the selectively hydrogenated versions thereof. In order to retain physical properties after long term elevated temperature aging or after high processing temperatures, the partially or totally hydrogenated block copolymers are often employed. Block sizes can also be adjusted in order to maintain optical clarity when formed into various articles. Useful block copolymers are available commercially from a number of sources, including Phillips Petroleum Co., LTD. under the trademark SOLPRENE, Kraton Polymers under the trademark KRATON, Dexco Polymers LP under the tradename VECTOR, Asahi Kasei Chemical Corporation under the tradenames ASAFLEX and TUFTEC, and Kuraray Co., LTD. under the trademark SEPTON.

Other useful impact modifiers include the so-called core-shell polymers built up from a rubber-like core on which one or more shells have been grafted. The core usually consists substantially of an acrylate rubber, butadiene rubber, or silicon-based rubber. One or more shells have been grafted on the core. Usually these shells are built up for the greater part from a vinylaromatic compound and/or a vinylcyanide and/or an alkyl(meth)acrylate and/or (meth)acrylic acid. In a one embodiment, the shell is mainly derived from vinylaromatic compound, such as styrene and/or alpha-methylstyrene, in order to provide good compatibility between the impact modifier and the polymer composition. The core and/or the shell(s) often comprise multi-functional compounds that may act as a cross-linking agent and/or as a grafting agent. These polymers are usually prepared in several stages using well-known emulsion chemistry. The particle size and composition can be adjusted to maintain optical clarity and enhanced ductility when formed into various articles. The core-shell polymers are available commercially from a number of sources, including from Rohm and Haas Company under the tradename PARALOID.

Additional impact modifiers include the block and graft copolymers of poly(arylene ether) and polysiloxanes. The block copolymers typically have A-B and A-B-A structures wherein the A blocks represent the poly(arylene ether). The preparation of these copolymers is well-known in the art and typically involves redistribution of an hydroxy terminated siloxane with a poly(arylene ether). The molecular weights of each component, hydroxy terminated siloxane with a poly(arylene ether), as well as their weight ratios can be readily optimized based, at least in part, on the desired physical properties desired in the filtered polymeric composition.

The impact modifier may be present in the polymeric composition in an amount effective to increase the ductility of the composition and is typically used in an amount less than or equal to 12.0 weight percent, or, more specifically, in an amount of 6.0 to 8.0 weight percent, wherein the weight percents are based on the total weight of the filtered polymeric material.

Also contemplated are filtered polymeric materials further comprising other resins in addition to the poly(arylene ether) and/or the poly(alkylene aromatic). Examples of such other resins include polyamides, poly(phenylene sulfide)s, polyetherimides, polyolefins, and the like.

The filtered polymeric material may, optionally, further comprise an additive selected from flame retardants, mold release agents and other lubricants, antioxidants, thermal stabilizers, ultraviolet stabilizers, pigments, dyes, colorants, anti-static agents, conductive agents, fillers, and the like, and a combination comprising at least one of the foregoing additives. Selection of particular additives and their amounts may be performed by those skilled in the art. If the additives are present in the polymeric material prior to filtration, the additive should be selected so as to not interfere with the particular filtration system chosen for the method. Optionally, additives may be added to the filtered polymeric material after the filtration step by methods known in the art, either prior to or post isolation of the filtered polymeric material. Furthermore, for some applications the presence of the additives must not adversely affect the surface quality or radial tilt properties of articles molded from the material. Special processing conditions during molding may be required to ensure an adequately smooth surface when molding filled articles.

Examples of pigments and dyes known to the art include those described in the chapter "Colorants" in "Plastic Additives Handbook, 4$^{th}$ Edition" R. Gachter and H. Muller (eds.), P. P. Klemchuck (assoc. ed.) Hansen Publishers, New York 1993.

Colorants include organic and inorganic pigments and dyes. Suitable inorganic colorants include carbon black, iron oxide, titanium dioxide, zinc oxide, zinc sulfide, and the like. Suitable organic colorants include those from the following chemical classes: anthanthrone, anthraquinone, benzimidazolone, diketopyrrolo-pyrrole, dioxazine, diazo, indanthrone, isoindoline, isoindolinone, naphthol, perinone, perylene, phthalocyanine, pyranthrone, quinacridone, quinophthalone, and the like.

The filtered polymeric material may also comprise flame retardants including non-halogenated flame retardants such as phosphate flame retardants, and halogenated flame retardants. Examples of suitable flame retardants include those found in the "Plastic Additives Handbook" under the chapter "Flame Retardants".

In one embodiment, prior to melt filtration, the poly(arylene ether) and/or poly(alkenyl aromatic) may be dissolved in a suitable solvent to form a solution which may be filtered through one or more solution filtration systems to form a filtrate. The poly(arylene ether) and/or poly(alkenyl aromatic) may be isolated from the filtrate prior to its introduction to the extruder employed to form the melt. Optionally the filtrate may be concentrated to a weight percent solids to form a concentrate which is then fed to the extruder comprising the melt filtration system. A weight percent solids of the concentrate comprising poly(arylene ether) and/or poly(alkenyl aromatic) may be 10 to 99 weight percent based on the total weight of polymeric material and solvent.

Suitable solvents for use in the solutions to be filtered from the above-described embodiment include a halogenated aromatic solvent, a halogenated aliphatic solvent, a non-halogenated aromatic solvent, a non-halogenated aliphatic solvent, or a mixture thereof. Suitable halogenated aromatic solvents include, but are not limited to, halobenzenes, ortho-dichlorobenzene, chlorobenzene, and the like. Suitable halogenated aliphatic solvents include, but are not limited to, chloroform, methylene chloride, 1,2-dichloroethane, and the like. Suitable non-halogenated aromatic solvents include, but are not limited to, benzene, toluene, xylenes, anisole, nitrobenzene, and the like. Suitable non-halogenated aliphatic solvents include, but are not limited to, acetone, ethyl acetate, and the like. The solvent may be the same as the polymerization solvent employed in the process of producing a poly(arylene ether) resin.

Suitable solution filtration systems include filters made from a variety of materials such as, but not limited to, sintered-metal fibers, cloth, polymeric fiber, natural fiber, paper, metal mesh, pulp, ceramic, or a combination of the foregoing materials, and the like.

The geometry of the filter employed in the solution filtration system may be cone, pleated, candle, stack, flat, wrap-around, or a combination of the foregoing, and the like.

The pore size of the filter employed in the solution filtration system may be 0.01 to 100 micrometer, or greater. Within this range, a pore size of less than or equal to 50 micrometers, or, more specifically, less than or equal to 20 micrometers or, even more specifically, less than or equal to 15 micrometers can be employed. Also within this range a pore size of greater than or equal to 0.1 micrometer, or, more specifically, greater than or equal to 3 micrometers, or, even more specifically, greater than or equal to 5 micrometers can be employed.

Suitable solution filtration processes may include gravity filtration, pressure filtration, vacuum filtration, batch filtration, continuous filtration, or a combination of the foregoing filtration methods, and the like.

There is no particular limitation on the method by which the poly(arylene ether) and/or poly(alkenyl aromatic) may be isolated from the filtrate. Generally desired are those isolation methods and associated processes that do not reintroduce a significant number of impurities and black specks into the filtered material. Suitable processes known in the art to remove a solvent from a resin are generally applicable. Such processes include, but are not limited to, precipitation, distillation, spray drying, film evaporation, devolatilization, and the use of flash vessels to evaporate the solvent. The several processes described herein for isolation may be used alone or in combination. When isolated, the poly(arylene ether) and/or poly(alkenyl aromatic) may be in the form of a powder, pellet, flake or a feed directly from the isolation process to the extruder comprising the melt filtration system.

Many of the isolation processes described above may be used to concentrate the filtrate without entirely removing the solvent from the filtrate, but instead to provide a concentrate having an increased percent solids which may be fed into the extruder employed for melt filtration. When a concentrate is fed into the extruder, the extruder is preferably a devolatilization extruder capable of removing solvent in the melt.

Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

In one embodiment, isolation comprises pre-concentration of the filtrate (partial evaporation of the solvent) and devolatilization extrusion steps. During pre-concentration, the major part of the solvent is removed by evaporation, typically, at an elevated temperature, for example, at 150 to 300° C., or, more specifically, at 180 to 260° C., and/or elevated pressure, for example 2 to 75 bar, or, more specifically, 5 to 50 bar. Pre-concentration removes 1.0 to 99 percent of the solvent present in the filtrate. Within this range less than or equal to 90 percent, or, more specifically, less than or equal to 80 percent of the solvent is removed. Pre-concentration is followed by devolatilization extrusion to remove the residual solvent.

If a pre-concentration step is used before the devolatilization step, the filtrate can be concentrated to 10 to 99 weight percent solids level based on the total of solvent and polymeric material. Concentrated solutions of the filtrate may be isolated from the remaining solvent by a devolatilization process.

In another embodiment, a method of purifying a polymeric material comprises melt blending poly(arylene ether) and poly(alkenyl aromatic) in a twin screw extruder to form a melt; and melt filtering the melt through a melt filtration system to produce a filtered polymeric material; wherein the extruder has a specific throughput rate of 0.5 kg/cm$^3$ to 8 kg/cm$^3$.

In one embodiment, a method of purifying a polymeric material comprises melt blending 60 to 30 weight percent of poly(phenylene ether) and 40 to 70 weight percent of polystyrene based on the total weight of poly(phenylene ether) and polystyrene in an extruder to form a melt; and melt filtering the melt through a melt filtration system to produce a filtered polymeric material, wherein the filtered polymeric material is substantially free of visible particulate impurities; and wherein the melt has an average residence time in the extruder of less than or equal to 1 minute.

In yet another embodiment, articles are made from the filtered polymeric materials prepared by any one of the methods presented herein. Exemplary articles include data storage media, such as but not limited to, optical, magneto, or magneto-optical data storage media. Such media include compact discs, re-writable compact discs, digital versatile disks, high density disks for data archival technology (DVR, such as BLU-RAY Disc), and the like.

In one embodiment, the substrate layer for storage media are made from the filtered polymeric materials prepared by any one of the methods presented herein. These storage media are preferably capable of being read with a light source having a wave length of 405 nanometers (nm) and preferably, having an objective-lens numerical aperture of 0.85. Alternatively, these storage media are preferably capable of being read with a light source having a wave length of 450 nm and an objective-lens numerical aperture of 0.65. Media having decreased wave lengths and a higher objective-lens numerical aperture to increase the overall capacity of the storage media are also contemplated; however, with possible decreased optical tolerances.

The articles may be made by a variety of molding and processing techniques. Suitable techniques to form articles include injection molding, foaming processes, injection-compression, rotary molding, two shot molding, microcellular molding, film casting, extrusion, press molding, blow molding, direct molding (see generally WO 02/43943 to Adedeji et al.), and the like. In one embodiment the technique comprises injection molding.

In one embodiment, the substrate layer is prepared by injection molding the filtered polymeric composition of poly(arylene ether) and poly(alkenyl aromatic) to form a disk substrate having reduced molded in stresses through the control of the injection molding parameters. Reduced molded in stresses in the substrate provides a disk assembly having increased dimensional stability, thereby exhibiting minimal tilt when the assembly is exposed to elevated temperatures. When injection molding a filtered polymeric composition of poly(arylene ether) and poly(alkenyl aromatic), a melt temperature of about 330 to 370° C. may be used. Within this range a melt temperature of greater than or equal to 340° C., or, more specifically, greater than or equal to 350° C. can be used. Also within this range a melt temperature of less than or equal to about 360° C., or, more specifically, less than or equal to about 355° C. can be used.

Also within the previous embodiment, a mold temperature of 90 to 130° C. may be used. Within this range a mold temperature of greater than or equal to 100° C. may be used, or, more specifically, greater than or equal to 110° C., or, even more specifically, greater than or equal to 115° C. Also within this range a mold temperature of less than or equal to 125° C., or, more specifically, less than or equal to 120° C. may be used. A clamp tonnage of greater than or equal to 12 tons, or, more specifically, greater than or equal to 20 tons, or, even more specifically, greater than or equal to 35 tons may be used.

When injection molding to prepare the substrate of the filtered polymeric composition, a cool time of 1 to 35 seconds may be used. Within this range the cool time can be greater than or equal to 5 seconds, or, more specifically, greater than or equal to 7 seconds, or, even more specifically, greater than or equal to 12 seconds. Also within this range the cool time can be less than or equal to 25 seconds, or, more specifically, less than or equal to 20 seconds, or, even more specifically, less than or equal to 15 seconds.

Furthermore, when injection molding to prepare the substrate from the filtered polymeric composition, a hold pressure of 1 to 40 kgf/cm$^2$ may be used. Within this range the hold pressure can be greater than or equal to 5 kgf/cm$^2$, or, more specifically, greater than or equal to 10 kgf/cm$^2$, or, even more specifically, greater than or equal to 15 kgf/cm$^2$. Also within this range the hold pressure can be less than or equal to 35 kgf/cm$^2$, or, more specifically, less than or equal to 30 kgf/cm$^2$, or, even more specifically, less than or equal to 25 kgf/cm$^2$.

When pellets produced by underwater die face pelletization are injection molded to form a disk the injection molding process is more efficient. The cycle time, the amount of time required to fill the molding tool, mold, cool and eject the disk, can be reduced by up to 0.30 second—a reduction of up to 2-10%. Additionally the disks produced show significantly fewer defects. In one embodiment, the average yield of disks free of defects greater than 100 micrometers is increased by greater than 10%, or more specifically, greater than 15%, or, more specifically, greater than 20%. In one embodiment the average yield of disks free of defects greater than 150 micrometers is increased by greater than 10%, or more specifically, greater than 15%. The number of defects on a disk may be determined by an automated scanner. The scanner may be incorporated as part of the processing line (an in-line scanner) or may be separate. An exemplary in-line scanner is a Dr. Schenk scanner, commercially available from Dr. Schenk of America.

Imperfections are detected by scanning using an in-line scanner. Approximately 30 nanometers of aluminum is sputtered onto one the surface of the disk. A video contrast camera scans the unmetallized surface of the disk with the incident light traveling through the thickness of the substrate. The light is reflected off the sputtered metal interface and travels back through the thickness of the substrate before being detected by the video contrast camera. The video contrast camera interprets the intensity of a line scan in which the disc is rotated 360 degrees around it's axis. The length, width and size of the imperfection are determined. Length is defined as the longest coherent arc length in track. The width is defined as the overall radial extent and the size is defined the diagonal of the smallest rectangle that encloses the defect. A defect is defined as an imperfection which exceeds size threshold, length threshold or size and length thresholds. FIG. 1 shows an exemplary imperfection, 5, having a length, 10, a size, 15, and a width, 20. When a disk has a defect greater than 150 micrometers, the length, the size or the length and the size are greater than 150 micrometers.

If the filtered polymeric material is used to form a data storage media substrate, for example, additional processing such as electroplating, coating techniques (spin coating, spray coating, vapor deposition, screen printing, painting, dipping, sputtering, vacuum deposition, electrodeposition, meniscus coating, and the like), lamination, data stamping, embossing, surface polishing, fixturing, and combinations comprising at least one of the foregoing processes, among others conventionally known in the art, may be employed to dispose desired layers on the polymeric material substrate. Essentially, the substrate may optionally be formed, in situ, with the desired surface features disposed thereon on one or both sides, a data storage layer such as a magneto-optic material also on one or both sides, and an optional protective, dielectric, and/or reflective layers. The substrate can have a substantially homogenous, tapered, concave, or convex geometry, with various types and geometries of reinforcement optionally employed to increase stiffness without adversely effecting surface integrity and smoothness.

An example of a polymeric material storage media comprises an injection molded filtered polymeric material substrate that may optionally comprise a hollow (bubbles, cavity, and the like) or filled (metal, plastics, glass, ceramic, etc., in various forms such as fibers, spheres, etc.) core. Disposed on the substrate are various layers including: a data layer, dielectric layer(s), a reflective layer, and/or a protective layer. These layers comprise conventional materials and are disposed in accordance with the type of media produced. For example, for a first surface media, the layers may be protective layer, dielectric layer, data storage layer, dielectric layer, and then the reflective layer disposed in contact with the substrate. An exemplary data storage media that may be prepared from the polymeric material described herein is disclosed in application Ser. No. 10/648,609 entitled "SUBSTRATE AND STORAGE MEDIA FOR DATA PREPARED THEREFROM" filed Aug. 26, 2003 and copending with the present application.

In one embodiment, the storage media comprises a substrate layer, typically having a thickness of 1.1 mm, made from a filtered polymeric composition prepared by any one of the methods presented herein. The storage media further contains a data layer set adjacent to the substrate layer and a cover layer set adjacent to the data layer and opposite to substrate layer to assemble a structure of substrate layer-data-cover layer, although addition layers, e.g., reflective layer and adhesive layer, may be placed in between the sequence of this structure. The cover layer has a thickness of 100 micrometers or less through which a light source passes to read, write, or read and write the data. The foregoing is often referred to as a "single layer disc." In one embodiment, the substrate layer of a storage media is made from the filtered polymeric materials prepared by any one of the methods presented herein and has a thickness of 1.1 mm and further contains a first recording layer set adjacent to the substrate layer followed by a spacer layer of 25 micrometers thickness, a second recording layer, and a cover layer having a thickness of 75 micrometers through which the light source passes to read, write, or read and write data to the recording layers. The foregoing arrangement of layers is often referred to as a "dual layer disc." In all instances, it is important that the cover layer have a high accuracy for the desired thickness, high transmittance of the laser light, e.g., 405 nm, and low birefringence. Additionally, for storage media that will not be contained within a protective case, the cover layer needs to provide scratch resistance and finger print resistance. Consequently, in many instances the cover layer will contain multiple layers that in combination have the desired thickness. For example, a desired 100 micrometer "cover layer" may contain a 98 micrometer actual cover layer with a 2 micrometer hard coat layer to achieve the desired scratch- and fingerprint-resistances.

The actual layer compositions between the substrate layer made from the filtered polymeric materials prepared by any one of the methods presented herein, and the cover layer can vary widely depending on the format-type of the storage media. For example, different layers are utilized for read-only media, write-once media, and rewritable media as well as for single layer and dual layer media and various light wavelengths and objective-lens numerical apertures. It is contemplated that the filtered polymeric materials prepared by any one of the methods presented herein will have utility as the substrate layer of a storage media regardless of the ancillary layers utilized.

The embodiments described herein include a poly(arylene ether)/poly(alkenyl aromatic) composition having, on average, less that 1 particulate, or, more specifically, less that 0.5 particulate, or, even more specifically, no particulates, of 175 micrometer, or, more specifically, 140 micrometer, or, even more specifically, 100 micrometer, average diameter per gram of the composition and a method to prepare such composition. It should also be clear that described herein is a poly(arylene ether)/poly(alkenyl aromatic) composition having on average less than 10 particulates, or, more specifically, less that 5 particulates, or, even more specifically, less than 3 particulates, of 50 micrometer average diameter per gram of the composition and a method to prepare such composition. It should be clear that described herein is a poly(arylene ether)/poly(alkenyl aromatic) composition having on average less than 10 particulates, or, more specifically, less than 5 particulates, or, even more specifically, less than 3 particulates, of 40 micrometer average diameter per gram of the composition and a method to prepare such composition. It should also be clear that described herein is a poly(arylene ether)/poly(alkenyl aromatic) composition having on average less than 30 particulates, or, more specifically, less than 20 particulates, or, even more specifically, less than 10, and yet even more specifically, less than 5 particulates, of 30 micrometer average diameter per gram of the composition and a method to prepare such composition. Further, it should be clear that described herein is a poly(arylene ether)/poly(alkenyl aromatic) composition having on average less than 200 particulates, or, more specifically, less than 50 particulates, or, even more specifically, less than 40 particulates, or even more specifically less than 25 particulates, of 20 micrometer average diameter per gram of the composition and a method to prepare such composition. It should be clear that described herein is a poly(arylene ether)/poly(alkenyl aromatic) composition having less than 60 particulates, or, more specifically, less than 50 particulates, or, even more specifically, less than 40 particulates, within the range of 20 to 100 micrometer average diameter per fifteen gram of the composition and a method to prepare such composition. The aforementioned particle diameters are based on an average of five measurements made on each sample, i.e. five sample measurements.

The present invention also includes a data storage medium having a substrate layer comprising a filtered polymeric composition containing poly(arylene ether) resin and poly(alkenyl aromatic) resin as provided herein; wherein the substrate layer has less than fifty particulates having average particle diameters within the range of 20 to 100 micrometers, more specifically within the range of 30 to 100 micrometers. In a one embodiment, the aforementioned substrate additionally contains no particulates having average particle diameters larger than 175 micrometers, or, more specifically, no particles having average particle diameters larger than 100 micrometers.

In one embodiment, a method of purifying a polymeric composition, comprises melt blending poly(arylene ether) and poly(alkenyl aromatic) in an extruder to form a melt; and melt filtering the melt through a melt filtration system to produce a filtered polymeric composition; wherein the filtered polymeric composition has, based on an average of five sample measurements, at least one of: (a) less than 200 particulates having an average diameter of 20 micrometers per gram of the filtered polymeric material, (b) less than 30 particulates having an average diameter of 30 micrometers per gram of the filtered polymeric material, (c) less than 5 particulates having an average diameter of 50 micrometers per gram of the filtered polymeric material, (d) less than 50 particulates within the range of 20 to 100 micrometers average diameter per fifteen grams of the filtered polymeric material, and (e) zero particulates having an average diameter of at least 175 micrometers per gram of the filtered polymeric material. The method further comprises at least one of (a) pelletizing the filtered polymeric composition, (b) filtering a solution comprising solvent and poly(arylene ether) through a solution filtration system to form a filtrate, removing solvent from the filtrate to form a concentrate comprising the poly(arylene ether), (c) operating the extruder at a specific throughput rate of 0.5 kg/cm$^3$ to 8 kg/cm$^3$, wherein the extruder is a twin-screw extruder, (d) operating the melt filtering wherein the melt has an average residence time in the extruder of less than or equal to 1 minute, (e) melt blending the melt with an additive selected from the group consisting of flame retardants, mold release agents, lubricants, antioxidants, thermal stabilizers, ultraviolet stabilizers, pigments, dyes, colorants, anti-static agents, conductive agents, and combinations comprising at least one of the foregoing additives, (f) melt blending the melt with an impact modifier, (g) locating the melt filtration system at the die head of the extruder, (h) blanketing of the internal free space of the extruder with an inert gas, (i) using a melt pump, (j) melt filtering under conditions wherein less than a five-fold pressure drop is observed as compared to the initial pressure drop obtained with a clean filtration system, (k) using an in-line or off-line quality monitoring system, (l) cooling the melt with de-ionized filtered water, (m) melt filtering the melt in a Class 100 environment, (n) packaging the filtered polymeric composition in a Class 100 environment, (o) wherein the melt filtration system comprises a by-pass system, and (p) pelletizing the filtered polymeric composition with an underwater die-face pelletizer system or a water ring pelletizer system.

In one embodiment, a data storage medium comprises a substrate layer, data and a cover layer, wherein the data is located between the substrate layer and the cover layer, wherein the cover layer has a thickness of 100 micrometers or less through which a light source passes to read, write, or read and write the data; wherein the substrate layer comprises a filtered polymeric composition; wherein the filtered polymeric composition comprises 90 to 10 percent by weight of poly(arylene ether) resin and 10 to 90 percent by weight of poly(alkenyl aromatic) resin and wherein the filtered polymeric composition has, based on an average of five sample measurements, at least one of: (a) less than 200 particulates having an average diameter of 20 micrometers per gram of the filtered polymeric material, (b) less than 30 particulates having an average diameter of 30 micrometers per gram of the filtered polymeric material, (c) less than 5 particulates having an average diameter of 50 micrometers per gram of the filtered polymeric material, (d) less than 50 particulates within the range of 20 to 100 micrometers average diameter per fifteen grams of the filtered polymeric material, and zero particulates having an average diameter of at least 175 micrometers per gram of the filtered polymeric material.

All cited patents, patent applications, and other references are incorporated herein by reference in their entirety. The invention is further illustrated by the following non-limiting examples.

EXAMPLES

Four example runs (Example runs 1-4) were performed to illustrate the method of melt filtering a melt comprising polyphenylene ether and polystyrene to form a polymeric material having reduced levels of particulate impurities.

Example run 1: A 40/60 percent by weight blend of polyphenylene ether (PPE, powder, 0.33 IV available from GE Advanced Materials, Plastics) and polystyrene (xPS, Novacor 2272; Mw 214,000, Mn 71,600, Mw/Mn 2.99; available from Nova Chemical) was compounded in a 40 millimeter (mm) twin screw compounder equipped with a vacuum vent. A vacuum was applied to the vent at 20 inches of mercury (508 millimeters of Hg). The compounded material was fed to a single screw extruder equipped with 3 barrels (zones). The extruder was equipped with a sintered metal fiber filter (PALL, 3 micrometer pores, candle geometry) located at the extruder die head.

The extruded melt strands were run through a clean, filtered water bath, the water having been filtered through a 10 micrometer filter to remove rust and impurities. The cooled strands of extruded polymeric material were dried and pelletized. Batches of the extruded melt were collected throughout the run, every half hour. The extruder processing conditions are provided in Table 1.

The procedure of Example run 1 was repeated for Example run 2 except that a 30 mm twin screw extruder was employed. The extruder processing conditions for Example run 2 are also provided in Table 1.

The procedure of Example run 1 was repeated for Example runs 3 and 4. The PPE-xPS formulation for Example runs 3 and 4 was a 50/50 percent by weight blend of 0.33 IV PPE and EB3300 grade xPS (Mw 276,000, Mn 51,500, Mw/Mn 5.36; available from Chevron Phillips Chemical). A 40 mm twin-screw extruder was used for Example run 3, while a 30 mm twin-screw extruder was used for Example run 4. The processing conditions for Example runs 3 and 4 are provided in Table 1. For all of the Examples the drive, rate, pressure, and melt temperature are averaged for the entire run.

TABLE 1

| | Example | | | |
|---|---|---|---|---|
| | 1 | 2 | 3 | 4 |
| Zone 1 (° C.) | 232 | 232 | 232 | 232 |
| Zone 2 (° C.) | 260 | 260 | 260 | 260 |
| Zone 3 (° C.) | 277 | 277 | 277 | 277 |
| Filter 1 (° C.) | 277 | 277 | 277 | 277 |
| Filter 2 (° C.) | 277 | 277 | 277 | 277 |
| Die (° C.) | 277 | 277 | 277 | 277 |
| Screw (rpm) | 85 | 100 | 85 | 85 |
| Drive (amps) | 8.0 | 7.4 | 10.0 | 11.0 |
| Rate (kg/hr) | 6.1 | 6.9 | 7.0 | 6.8 |
| Filter In Press. (kg/cm$^2$) | 198 | 227 | 201 | 275 |
| Filter Out Press. (kg/cm$^2$) | 26 | 14 | 25 | 27 |
| Filter In Melt Temp. (° C.) | 278 | 318 | 279 | 281 |
| Filter Out Melt Temp. (° C.) | 292 | 298 | 296 | 296 |
| Visible Specks (avg.) | 3.3 | 2 | 1.6 | 1.7 |
| Filter Type/pore size (micrometer) | PALL candle, 3 | PALL candle, 3 | PALL candle, 3 | PALL candle, 3 |

Samples from the runs of Examples 1-4 were tested for visual particulates according to the following procedure. Samples of polymeric material for each run were taken every half hour for each of the Example runs (1-4). Each sample was tested twice for visible particulates. Particles of 30 micrometer average diameter or greater are readily observed without magnification. Two ounce sample bottles with polyseal caps were subjected to a stream of filtered air to remove any particulates present. The bottles were rinsed with a small amount of HPLC grade chloroform ($CHCl_3$) and fifty milliliters (ml) of HPLC grade $CHCl_3$ was added to each sample bottle. Using a lightbox, the number of visible specks or particulates was recorded for each $CHCl_3$ blank. A 10.00 gram amount of a sample was weighed out on a clean aluminum pan and added to one of the bottles containing $CHCl_3$. This procedure was repeated for every sample. The samples were allowed to dissolve and then viewed in the lightbox for the presence of visible specks. An average number of specks were calculated for each run, four runs total (Examples 1-4). The results of the visible particle analysis for Example runs 1-4 are found in Table 1. Typical visible speck numbers for similar compositions prepared without the use of the melt filter are in excess of 50 for a 10 gram sample. These data are quite unexpected as with the relatively large number of specks in the unfiltered material, it was expected that the small pore size filter as used in these examples would plug rapidly. Additionally, it was expected that gelled particles would distort and pass through the filter leading to a significantly higher particulate number. For comparative purposes, a 500 mesh woven metal screen filter having pore openings of 25 micrometers afforded filtered material having in excess of 10 visible specks, i.e. specks greater than 30 micrometers, per 10 gram sample. It should be clear that one embodiment of the present invention is a method to make a composition comprising poly(arylene ether) and poly(alkyenyl aromatic) that has less that 20 visible specks, or, more specifically, less than 10 visible specks, or, even more specifically, less than 5 visible specks, per 10 gram sample.

Several samples from the runs of Examples 1-4 were additionally analyzed to obtain a size distribution of the particulate contaminants present in the materials. Two samples from Example run 2 (Ex. 2, S1 and Ex. 2, S2), one sample from Example run 3 (Ex. 3, S1), and two samples from Example run 4 (Ex. 4, S1 and Ex. 4, S2) were tested for particulate content according to the procedure below. Amounts of particulates having sizes of 5 micrometers to 100 micrometers were determined using a Pacific Instruments ABS2 analyzer that employs a laser light scattering technique. A 40.0 gram amount of each sample was dissolved in 400 ml of HPLC grade $CHCl_3$ contained in a clean polyethylene bottle. A 20 ml quantity of each sample solution was allowed to flow through the ABS2 analyzer detector at a flow rate of 1 ml/minute (+/−5%). The amount of particulates of varying sizes present in the sample was measured in the detector during this process. Each sample was tested five times and averaged to yield a final number. Two comparative examples were prepared and tested. Comparative Example 1 (CE 1) was an unfiltered blend of 50/50 weight percent 0.33 IV PPE/ EB3300 grade xPS. Comparative Example 2 (CE 2) was optical quality polycarbonate (OQ-PC, LEXAN® 1050 available from GE Advanced Materials, Plastics). The results of the ABS2 analyzer particle analysis in particles per gram can be found in Table 2, along with the blank data ($CHCl_3$ alone).

TABLE 2

| Example, Sample # | Particulate Size (micrometers) | | | | | | | |
|---|---|---|---|---|---|---|---|---|
| | 5 | 10 | 15 | 20 | 30 | 40 | 50 | 100 |
| | Particles per gram | | | | | | | |
| Ex. 2, S1 | 654.3 | 111 | 38.7 | 23.3 | 3.2 | 0.9 | 1.2 | 0.1 |
| Ex. 2, S2 | 561.8 | 91.1 | 34.4 | 16.5 | 1.9 | 0.4 | 0.6 | 0.1 |
| Ex. 3, S1 | 689.8 | 90 | 32.7 | 15.6 | 2.6 | 0.5 | 0.4 | 0.1 |
| Ex. 4, S1 | 1919.9 | 143.7 | 44.3 | 20.1 | 2.4 | 0.6 | 0.2 | 0 |
| Ex. 4, S2 | 1117.5 | 114.8 | 42.9 | 26.6 | 3.6 | 1.8 | 0.2 | 0 |
| CE 1 | 6901.25 | 1237.5 | 500 | 396.25 | 85 | 23.75 | 30 | 5 |
| CE 2 | 317.000 | 58.88 | 52.88 | 14.88 | 3.38 | 0.75 | 0 | 0 |
| $CHCl_3$ | 15.15 | 3.65 | 1.25 | 0.25 | 0 | 0 | 0 | 0 |

The results of the above experiments show a significant reduction in the overall number particulate impurities between the unfiltered sample (CE 1) and the filtered samples (Ex. 2, S1; Ex. 2, S2; Ex. 3, S1; Ex. 4, S1; and Ex. 4, S2). Furthermore, the particulate impurity level of the Examples of the present method is comparable to or better than OQ-PC (CE 2) with regard to particulates of 15 micrometers or greater. It is quite unexpected that such a large reduction in the number of particles per gram in a poly(arylene ether)/poly(alkenyl aromatic) composition was obtained over the particle size range between 20 and 100 micrometers through the use of a sintered metal fiber filter. As previously explained, it was expected that the poly(arylene ether)/poly(alkenyl aromatic) composition would foul or plug the filter rapidly and either push larger particles through the filter or collapse the filter. In contrast, the procedure of Example run 1 using a 40 mm twin screw extruder was repeated with a run time using the same melt filtration system in excess of 40 continuous hours with less than a 10% increase in the back pressure as measured at a location immediately before the melt filtration system and unexpectedly, without a significant increase in the number of particulates observed in the filtered polymeric composition even after 40 hours of continuous operation. It was additionally expected that the poly(arylene ether)/poly(alkenyl aromatic) composition would have to be run only at a very low specific throughput rate. However, in contrast, specific throughput rates in excess of 5 kg/hr/cm³ were unexpectedly achieved.

Example run 5: A 50/50 percent by weight blend of polyphenylene ether (PPE, powder, 0.33 IV available from GE Advanced Materials, Plastics) and polystyrene (xPS, Novacor 2272; Mw 214,000, Mn 71,600, Mw/Mn 2.99; available from Nova Chemical) was compounded in a 25 millimeter (mm) twin screw compounder equipped with a vacuum vent. A vacuum was applied to the vent at 20 inches of mercury (508 millimeters of Hg). The extruder was equipped with a sintered metal fiber filter (PALL, 3 micrometer pores, candle geometry) located before the extruder die head. The extruder was equipped with an underwater die face pelletizer having a 2 hole die with an 8 blade cutter operating at a speed of 2000 rotations per minute. The feed rate to the extruder was 100 pounds per hour. The die holes had a 3.2 millimeter diameter. The die temperature was 330° C., the temperature of the melt in the die was 299 to 301° C. and the water temperature was 80° C. The melt pressure at the die was 980 to 1000 psi. The pellets were ovoid with an average longest diameter of 3.9 millimeters and an average shortest diameter of 3.4 millimeters. The average longest diameter and the average shortest diameter were determined by measuring 12 randomly selected pellets. The average pellet weight was 0.025 grams. The average pellet weight was determined by randomly selecting 50 pellets and measuring their total weight and dividing the total weight by 50. The unvibrated bulk density was determined by using a 95.9 mm diameter by 48.2 mm tall cylinder. The vibrated bulk density was determined by measuring the weight of pellets that filled the same cylinder after repeated tapping cycles during the filling process. The unpacked (unvibrated) bulk density of the pellets was 0.58 grams per cubic centimeter (gm/cc) whereas the packed (vibrated) bulk density was 0.63 gm/cc. Two samples of the filtered polymeric material made in Example run 5 were injection molded using a barrel temperature less than or equal to 315° C. to form a data storage medium substrate layer. Each sample produced approximately 5,000 disks.

The disks were sputter coated and analyzed for defects using a Dr. Schenk in line scanner. Results are shown in Table 4. The comparative example (Comp. 1) is the average results of greater than 10 batches of material produced using strand pelletization are also shown in Table 3.

TABLE 3

| Example | Average defects per disk for defects >100 micrometers | Yield of disks having no defect >100 micrometers | Average defect per disk for defects >150 micrometers | Yield of disks having no defect >150 micrometers |
|---|---|---|---|---|
| Comp. 1 | 2.16 | 24.39% | 1.14 | 45.31% |
| Sample 1 | 0.82 | 53.25% | 0.41 | 72.10% |
| Sample 2 | 0.95 | 50.82% | 0.52 | 66.72% |

As can be seen from the foregoing example, the use of pellets made by underwater pelletization had a significant impact on the number of defects in the molded disk by increasing the yield of disks having no defects greater than 100 micrometers by more than 25%. In addition, use of pellets made by underwater pelletization decreased the molding cycle time by 0.25 to 0.30 seconds.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. Pellets having an unvibrated bulk density which is greater than or equal to 94% of the vibrated bulk density wherein the pellets consist of a filtered polymeric composition comprising about 90 to about 10 percent by weight of poly(arylene ether) resin and about 10 to about 90 percent by weight of poly(alkenyl aromatic) resin, based on the total weight of the poly(alkenyl aromatic) and poly(arylene ether) resins and wherein the filtered polymeric composition has, based on an average of five sample measurements, at least one of:
(a) less than 200 particulates having an average diameter of 20 micrometers per gram of the filtered polymeric material,
(b) less than 30 particulates having an average diameter of 30 micrometers per gram of the filtered polymeric material,
(c) less than 5 particulates having an average diameter of 50 micrometers per gram of the filtered polymeric material,
(d) less than 50 particulates having an average diameter within the range of 20 to 100 micrometers per fifteen grams of the filtered polymeric material, and
(e) zero particulates having an average diameter of at least 175 micrometers per gram of the filtered polymeric material.

2. The pellets of claim 1,
wherein the poly(arylene ether) comprises at least one of (a) poly(2,6-dimethyl-1,4-phenylene ether) and (b) poly(2,6-dimethylphenylene ether-co-2,3,6-trimethylphenylene ether), and wherein the poly(arylene ether) has an intrinsic viscosity of about 0.10 to about 0.60 deciliters per gram as measured in chloroform at 25° C.; and wherein the poly(alkenyl aromatic) is at least one of
(i) atactic homopolystyrene and
(ii) non-elastomeric block copolymer of styrene and one or more polyolefins.

3. The pellets of claim 1 wherein the pellet has a diameter of 3 to 4 millimeters.

4. The pellets of claim 1 wherein the ratio of shortest diameter to longest diameter is 1 to 0.8.

5. The pellets of claim 1 wherein the pellet has a weight of 0.0005 grams to 0.10 grams.

6. The pellets of claim 1, wherein the pellets have an unvibrated bulk density which is greater than or equal to 96% of the vibrated bulk density.

7. The pellets of claim 1, wherein the pellets have an unvibrated bulk density which is greater than or equal to 98% of the vibrated bulk density.

8. The pellets of claim 1, wherein the pellets are substantially free of surface voids that extend greater than or equal to one third of the pellet diameter.

* * * * *